United States Patent
Knodle et al.

(10) Patent No.: US 10,279,745 B2
(45) Date of Patent: May 7, 2019

(54) STABLE PLATFORM FOR MOTOR VEHICLES

(71) Applicant: Practical Pet Solutions LLC, Seattle, WA (US)

(72) Inventors: Daniel W. Knodle, Seatle, WA (US); Jedediah J. McCann, Seattle, WA (US)

( * ) Notice: Subject to any disclaimer, the term of this patent is extended or adjusted under 35 U.S.C. 154(b) by 36 days.

(21) Appl. No.: 15/710,616

(22) Filed: Sep. 20, 2017

(65) Prior Publication Data
US 2018/0154834 A1    Jun. 7, 2018

Related U.S. Application Data

(63) Continuation of application No. 14/702,180, filed on May 1, 2015, now Pat. No. 9,840,201.

(60) Provisional application No. 61/987,874, filed on May 2, 2014.

(51) Int. Cl.
*B60R 3/02* (2006.01)
*B60R 3/00* (2006.01)

(52) U.S. Cl.
CPC ............ *B60R 3/02* (2013.01); *B60R 3/007* (2013.01)

(58) Field of Classification Search
CPC ............ B60R 3/02; B60R 3/007; B60R 3/00
See application file for complete search history.

(56) References Cited

U.S. PATENT DOCUMENTS

| | | |
|---|---|---|
| 3,266,594 A | 8/1966 | Antosh et al. |
| 5,738,362 A | 4/1998 | Ludwick |
| 6,237,927 B1 | 5/2001 | Debo |
| 6,659,484 B2 | 12/2003 | Knodle et al. |
| 6,682,086 B1 | 1/2004 | Erickson |
| 6,685,204 B1 | 2/2004 | Hehr |
| 7,185,904 B1 | 3/2007 | Jones et al. |
| 7,195,262 B2 | 3/2007 | Chaudoin et al. |
| 7,219,911 B2 | 5/2007 | Sukonthapanich et al. |
| 7,490,889 B1 | 2/2009 | Scoggins |
| 7,503,572 B2 | 3/2009 | Park et al. |
| 7,635,247 B2 | 12/2009 | Collins |
| 7,766,357 B2 | 8/2010 | Arvanites |
| 7,967,311 B2 | 6/2011 | Phillips |
| 9,187,042 B2 | 11/2015 | Kuo |
| 9,266,476 B2 * | 2/2016 | Mendoza ............... B60R 3/02 |
| 9,914,397 B2 * | 3/2018 | Hoffman ............... B60R 3/007 |
| 9,944,231 B2 * | 4/2018 | Leitner ............... B60R 3/02 |
| 2004/0256833 A1 | 12/2004 | Cervenka |
| 2006/0170179 A1 | 8/2006 | Dahl |

* cited by examiner

*Primary Examiner* — James M Dolak
(74) *Attorney, Agent, or Firm* — John Janeway; Janeway Patent Law, PLLC (57) ABSTRACT

A stowable platform for motor vehicles which extends beyond the vehicle when in use but is stowed beneath the vehicle. The platform is pivotably secured to an elongated arm which is in turn pivotably secured to the vehicle and is positively locked in both positions.

8 Claims, 10 Drawing Sheets

STABLE PLATFORM FOR MOTOR VEHICLES

CROSS REFERENCE TO RELATED APPLICATIONS AND CLAIM OF PRIORITY

This application is a continuation application claiming priority to U.S. patent application Ser. No. 14/702,180 filed 1 May 2015, and titled "STABLE PLATFORM FOR MOTOR VEHICLES", presently pending and incorporated by reference. U.S. patent application Ser. No. 14/702,180 claims priority to provisional application No. 61/987,874 filed May 2, 2014 and is hereby also incorporated by reference.

TECHNICAL FIELD

The present invention relates to a retractable platform moveable from a stowed position beneath a vehicle and an operable position extending beyond the vehicle. More particularly, the invention relates to pickup trucks, wherein the platform needs to extend beyond the open tailgate and yet remain stable and safe. The platform is selectively locked in prescribed positions and requires deliberate action to unlock.

BACKGROUND OF THE INVENTION

The need for a step for assistance into a vehicle has long been recognized, as illustrated by the running board typically found on older pickup trucks and by accordion-type steps which collapse inside a motor home or trailer. It has further been recognized that oftentimes, pets need assistance to get into or out of vehicles such as SUV s or pickup trucks and yet such apparatus needs to be out of the way when not in use.

Prior art which recognized the above needs is illustrated by U.S. Pat. No. 6,935,647 granted to Knodle et al on Aug. 30, 2005, which discloses a stowable step formed of a unitary element pivotably but removably secured to the receiver of a trailer hitch. The step is locked in its selected position.

Another stowable platform is disclosed in U.S. Pat. No. 7,025,365 granted to Bang et al on Apr. 11, 2006. This disclosure illustrates a platform that is removably secured to a trailer hitch secured in the stowed position beneath the vehicle or in the extended position, but further is capable of further extension or elevation.

U.S. Pat. No. 7,204,501 discloses a universal stowable step which can be adjusted upon installation to accommodate a large variety of vehicles, adaptable to fit different trailer hitch sizes and vehicles of differing heights. Stability and security are enhanced.

SUMMARY OF THE INVENTION

With the above-noted prior art in mind, the present invention provides a stowable platform for pickup trucks which is lighter in weight, has fewer parts and is adjustable in height to accommodate differing vehicle clearances to accommodate spare tires, exhaust systems or the like.

Further, the present invention provides a stable retractable platform for pickup trucks, wherein the securement feature is enhanced, more user-friendly and requires deliberate action to unlock.

BEST MODE FOR CARRYING OUT THE INVENTION

Figure 1:
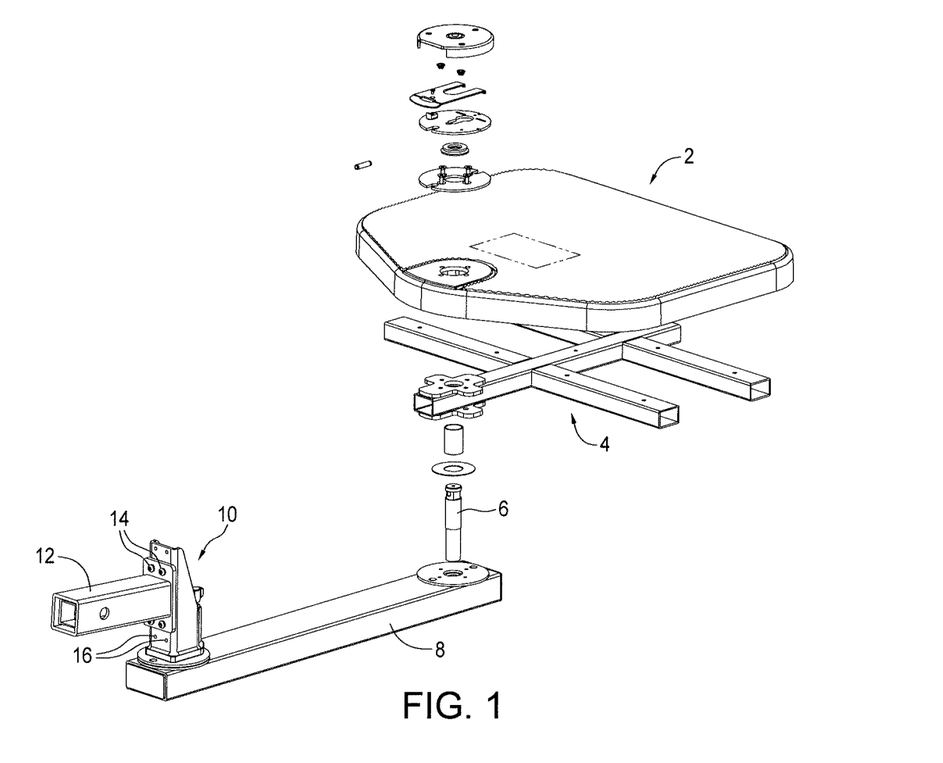
FIG. 1 shows a partially exploded view of a step, according to an embodiment of the invention.

As seen in FIG. 1, the stable retractable platform comprises a platform 2 stabilized and reinforced by framework 4 pivotably mounted on a shaft 6 and locked in the desired position by a mechanism to be explained hereinafter.

The shaft 6 is fixedly secured to a hollow beam or arm 8 which is pivotally secured to an inboard latching mechanism 10, to be explained hereinafter, which is removably secured to a trailer hitch receiving tube (not shown) by rearwardly extending tube 12. It is to be noted that latching mechanism 10 is secured to the end of tube 12 by threaded fasteners 14 which are selectively secured in bores 16, permitting vertical adjustment.

Figure 2:
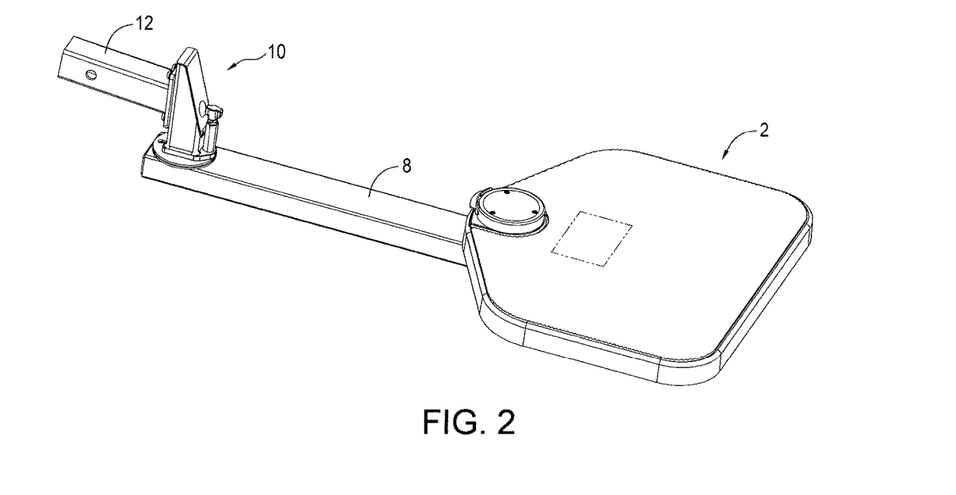
FIG. 2 shows the step in FIG. 1 in an extended position, according to an embodiment of the invention.

Reference is now had to FIG. 2, wherein the platform 2 is deployed in a position which would extend beyond an open pickup tailgate. Arm or beam 8 as well as platform 2 are in their outermost position, where they would be locked for stability and security.

Figure 3:
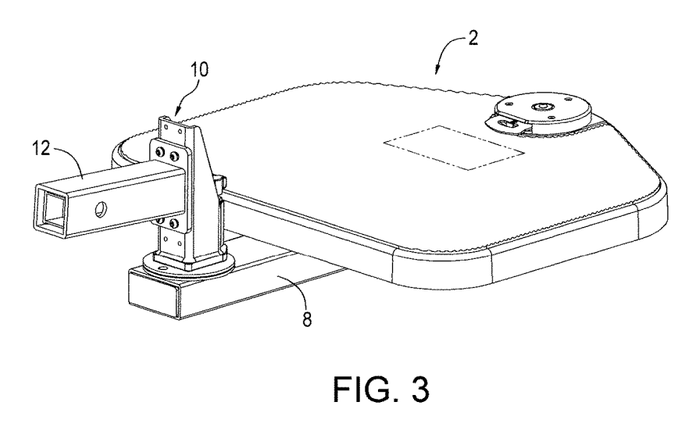
FIG. 3 shows the step in FIG. 1 in an intermediate position, according to an embodiment of the invention.

FIG. 3 depicts the platform in a partially deployed position. Arm or beam 8 is extended and locked, but platform 2 has not been extended but is locked. It is to be understood that the platform is safe to use in this position, such as when the tailgate is not open.

Figure 4:
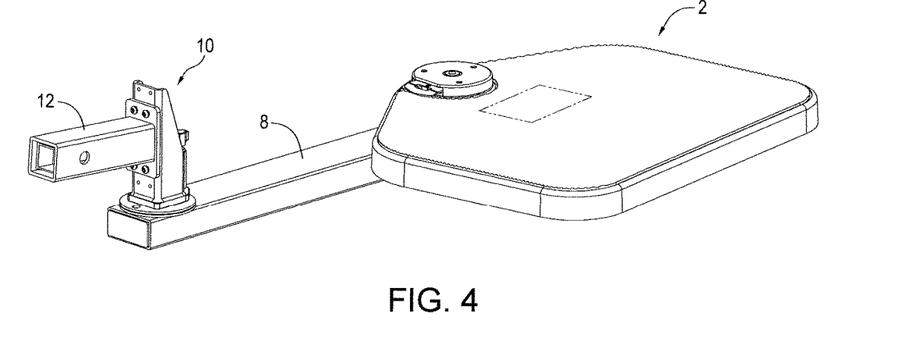
FIG. 4 shows the step in FIG. 1 in another intermediate position, according to an embodiment of the invention.

FIG. 4 depicts the platform in transition between that shown in FIG. 2 and FIG. 3.

Figure 5:
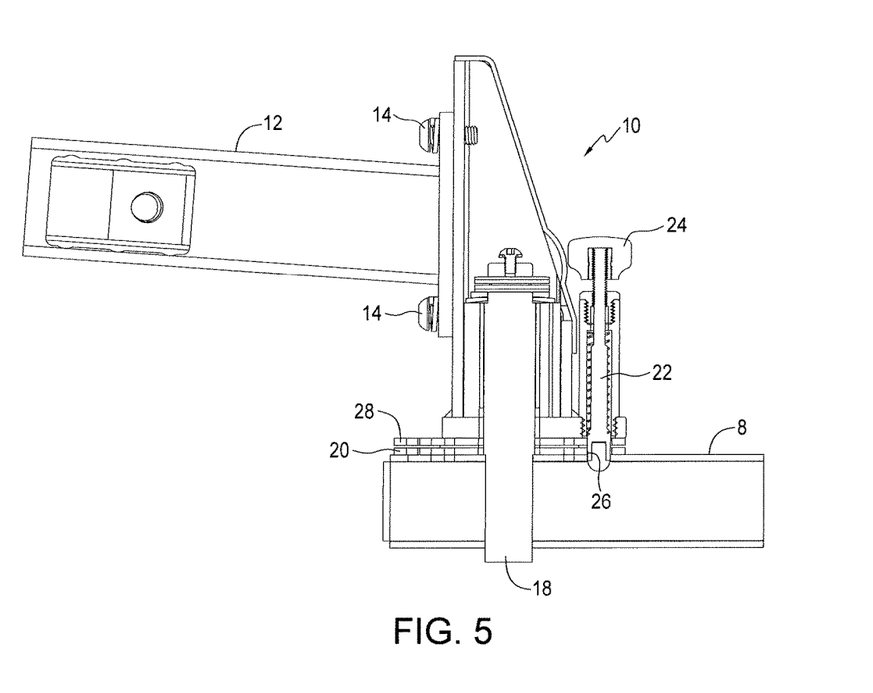
FIG. 5 shows a sectional view of an inboard latching structure of the step in FIG. 1, according to an embodiment of the invention.

As best seen in FIG. 5, beam or arm 8 is pivotally mounted to shaft 12, which is inserted into the trailer hitch receptacle (not shown) by locking mechanism 10. Arm 8 is secured to rotatable shaft 18, washer 20 interfacing the fixed portion. Locking shaft 22, which is spring-biased to the downward position, controlled by handle 24, is locked in bore 26 in the extended position or in bore 28 in the retracted position. Shaft or arm 8 rotates 180° between the two positions.

Figure 6:
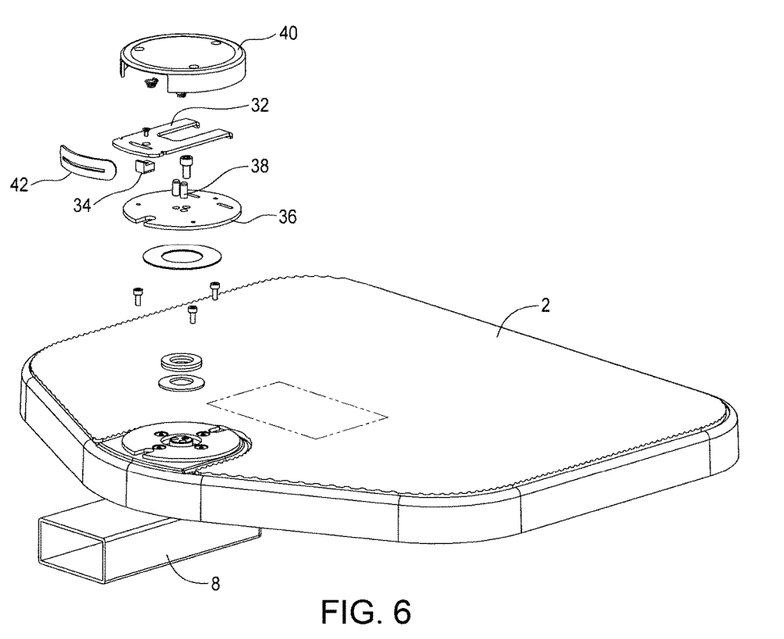
FIG. 6 shows a partially exploded view of a platform latching structure of the step in FIG. 1, according to an embodiment of the invention.
Figure 7:
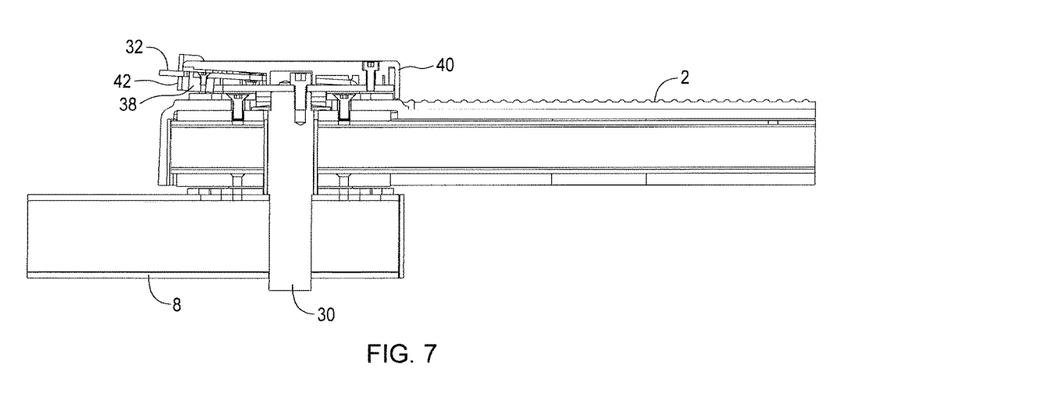
FIG. 7 shows a sectional view of the platform latching structure in FIG. 6, according to an embodiment of the invention.
Figure 8:
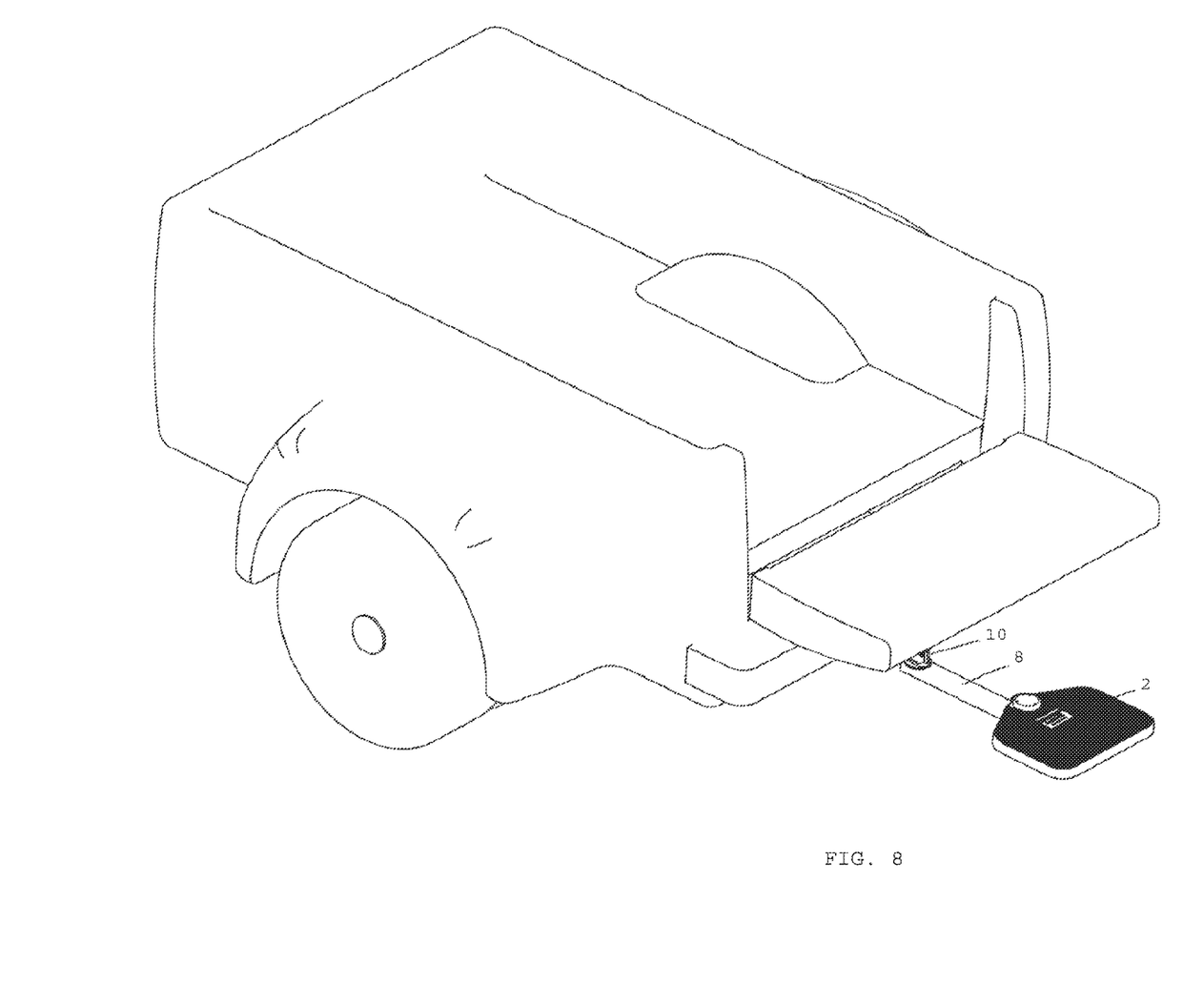
FIG. 8 shows the step in FIG. 2 attached to a vehicle, according to an embodiment of the invention.
Figure 9:
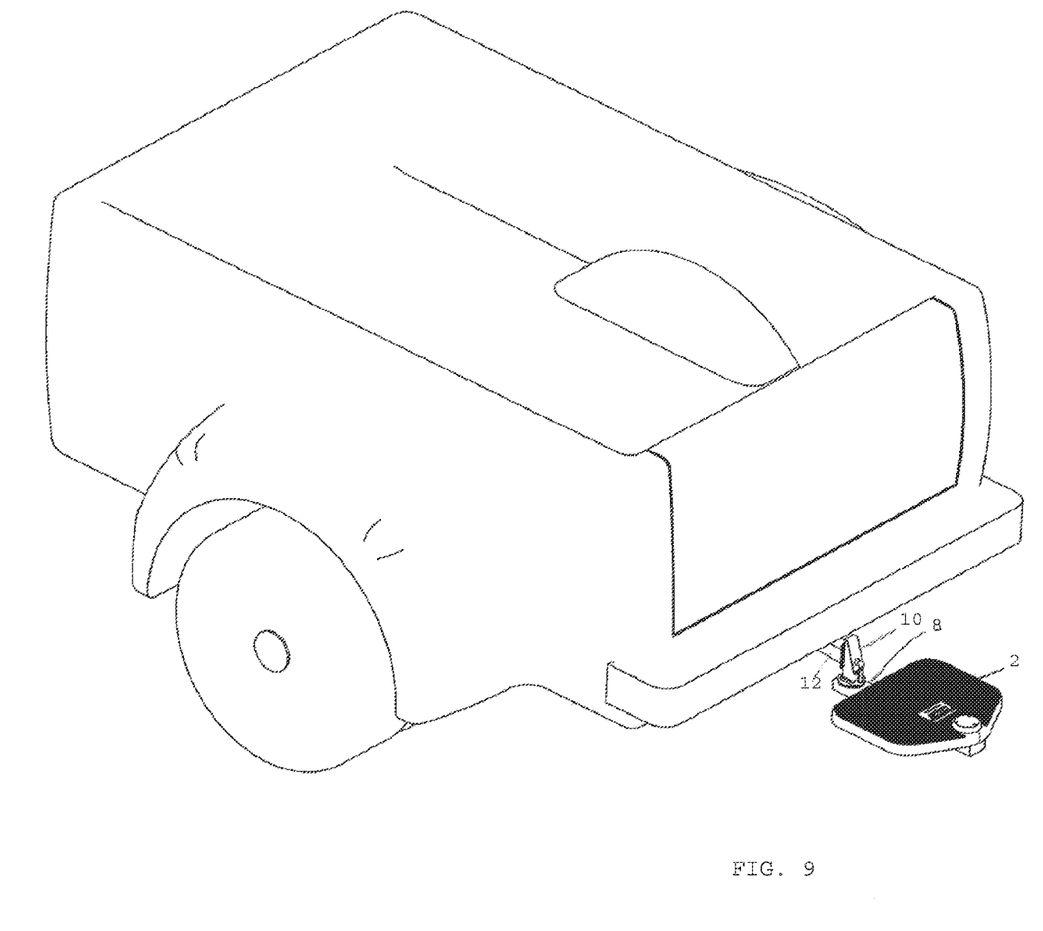
FIG. 9 shows the step in FIG. 3 attached to a vehicle, according to an embodiment of the invention.
Figure 10:
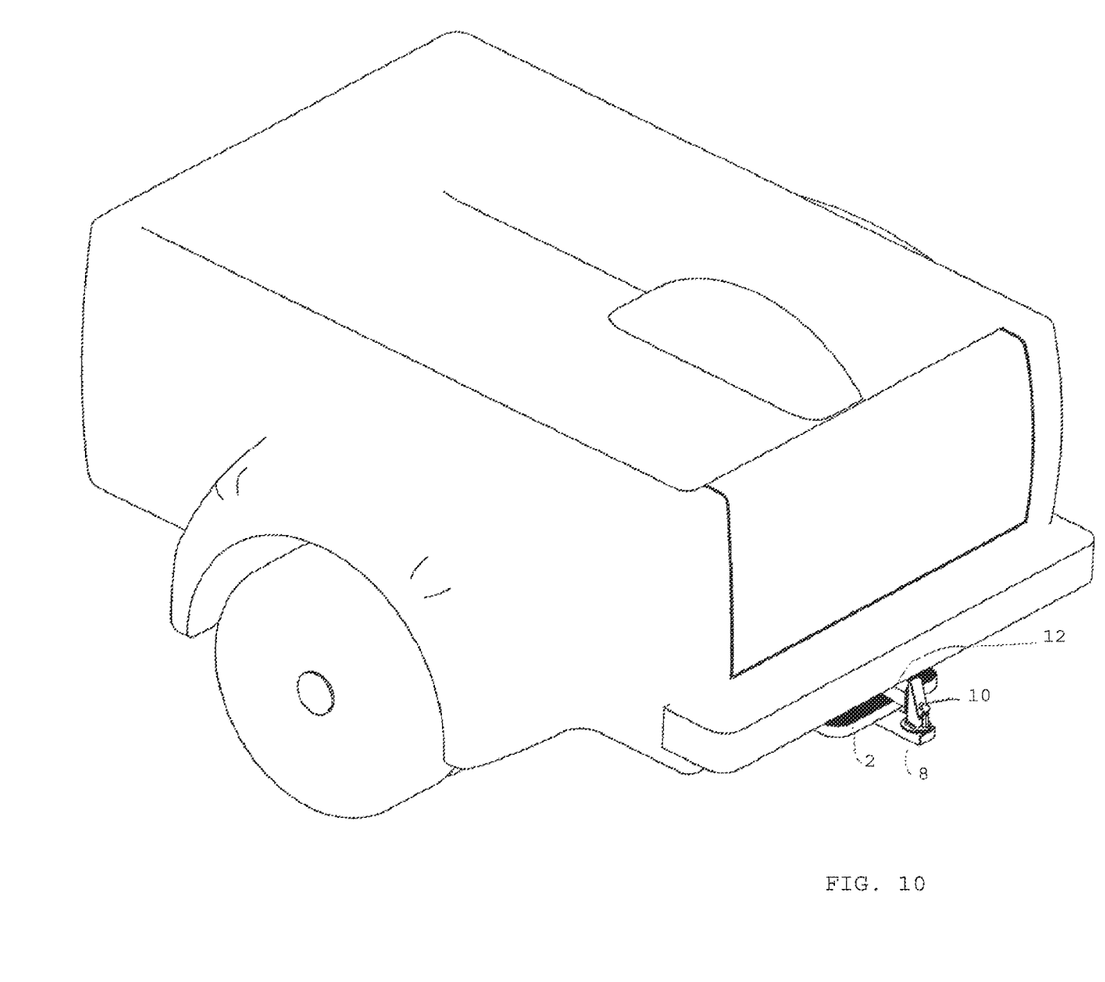
FIG. 10 shows the step in FIG. 1 attached to a vehicle and in a position in which the step's platform extends underneath the vehicle, according to an embodiment of the invention.

Reference is now had to FIGS. 6 and 7, wherein the platform latching mechanism is illustrated. The platform 2 is rotated about shaft 30 secured to beam or arm 8 and latched in position by latch 32 and key 34. The latch 32 is keyed into disc 36, which is pinned to shaft 30 by pins 38. The entire assembly is protected by cap 40 and dust cover 42. T release the platform, the latch 32 must be lifted.

Thus, as can be seen, the present invention provides a safe, lightweight extendable platform which is easily secured beneath the vehicle but is extendable beyond a lowered tailgate.

Although a preferred embodiment of the invention has been disclosed for purposes of illustration, it should be understood that various changes, modifications and substitutions may be incorporated in the embodiment without departing from the spirit of the invention, which is defined by the claims which follow.

What is claimed is:

1. A stable, selectively extending step for use with a motor vehicle, the step comprising:
    a first section removably attached to a vehicle;
    an elongated second section having a first end and a second end distal from the first end, the first end coupled with the first section, rotatable relative to the first section, and selectively lockable in:
        a first position in which the second section extends outwardly from the vehicle when the first section is attached to the vehicle, and
        a second position in which the second section extends underneath the vehicle when the first section is attached to the vehicle; and
    a third section having a platform for use as a step, the platform being coupled with the second section's second end, rotatable relative to the second end, and selectively lockable in a first position and a second position such that the platform is lockable in the first position and in the second position when the second section is in the second section's first position or when the second section is in the second section's second position, wherein:
        the first position of the platform is defined by the platform extending away from the first section such that when the second section is in the second section's first position and the first section is attached to the vehicle, the platform extends outwardly from the vehicle, and
        the second position of the platform is defined by the platform extending toward the first section such that when the second section is in the second section's second position and the first section is attached to the vehicle, the platform extends underneath the vehicle.

2. The step of claim 1 wherein the first section is removably attachable to a trailer hitch receiving tube.

3. The step of claim 1 further comprising an inboard latching mechanism that couples the first section with the second section and confines the rotation of the second section to a vertical axis when the first section is attached to the vehicle.

4. The step of claim 1 wherein the second section's second position is defined by the second section rotated 180 degrees relative to the second section's first position.

5. The step of claim 1 further comprising a locking shaft that extends into a bore in the first end of the second section to lock the second section in one of the second section's selectively lockable positions.

6. The step of claim 1 further comprising a platform latching mechanism that that couples the platform with the second section and confines the rotation of the platform to a vertical axis when the first section is attached to the vehicle.

7. The step of claim 1 wherein the platform's second position is defined by the platform rotated 180 degrees relative to the platform's first position.

8. The step of claim 1 further comprising a key that is held by a latch and a first disk and that extends into a slot of a second disk mounted to the platform to lock the platform in one of the platform's selectively lockable positions.

* * * * *